United States Patent
Botkin et al.

(10) Patent No.: US 11,954,016 B2
(45) Date of Patent: *Apr. 9, 2024

(54) REJECTING, DURING VALIDATION, SEQUENCES OF COMPONENTS WITH INVALID INPUT DEPENDENCIES

(71) Applicant: PING IDENTITY INTERNATIONAL, INC., Denver, CO (US)

(72) Inventors: Krismy Alexandra Botkin, Vancouver, WA (US); Benjamin Anthony Apple, Vancouver, WA (US); Jonathan David Branch, Camas, WA (US); Colin Madigan Dean, Oakland, CA (US)

(73) Assignee: Ping Identity International, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,501

(22) Filed: Feb. 17, 2023

(65) Prior Publication Data

US 2023/0195604 A1 Jun. 22, 2023

Related U.S. Application Data

(63) Continuation of application No. 16/790,724, filed on Feb. 13, 2020, now Pat. No. 11,586,530.

(51) Int. Cl.
*G06F 11/36* (2006.01)
*G06F 8/34* (2018.01)
(Continued)

(52) U.S. Cl.
CPC ............ *G06F 11/3668* (2013.01); *G06F 8/34* (2013.01); *G06F 3/0482* (2013.01); *G06F 3/04847* (2013.01); *G06F 3/0486* (2013.01)

(58) Field of Classification Search
CPC ............ G06F 11/3664; G06F 11/3684; G06F 11/3688; G06F 11/3466; G06F 8/34; G06F 8/38

See application file for complete search history.

(56) References Cited

U.S. PATENT DOCUMENTS

| 2014/0165043 A1* | 6/2014 | Pasala ................. G06F 11/3684 717/124 |
| 2016/0140023 A1 | 5/2016 | Michelsen et al. |

(Continued)

OTHER PUBLICATIONS

"Theme Node, Dynamically theme the ForgeRock out-of -the-box US on the fly", Oct. 2020, ForgeRock, Inc.,pp. 5 pgs (downloaded from https://web.archive.org/web/20201024234908/https://backstage.forgerock.com/marketplace/entry/AXCzY977aAqky-XCyaXV).

(Continued)

*Primary Examiner* — Duy Khuong T Nguyen
(74) *Attorney, Agent, or Firm* — Haynes Beffel & Wolfeld, LLP; Ernest J. Beffel, Jr.

(57) ABSTRACT

The disclosed technology teaches rejecting, during validation, a sequence of components intended for interacting with a user. Included are providing a sequence setup GUI supporting construction of an executable sequence by connecting at least five components in a directed graph, and tracing multiple paths through the directed graph, including from at least one conditional branch at a first up-chain component, in which down-chain components accept as input and depend on output from at least one up-chain component, referred to as input chain dependencies. Also included are locating at least one error in use of a particular down-chain component when invoked following one of the multiple paths, where the error results from failure to satisfy any of the input chain dependencies of the particular down-chain component, and reporting the error during validation to a (Continued)

user of the GUI, before passing the sequence of components from validation to use in production.

18 Claims, 7 Drawing Sheets

(51) Int. Cl.
   *G06F 3/0482* (2013.01)
   *G06F 3/04847* (2022.01)
   *G06F 3/0486* (2013.01)

(56) References Cited

U.S. PATENT DOCUMENTS

| | | |
|---|---|---|
| 2016/0217062 A1 | 7/2016 | Singi et al. |
| 2018/0189033 A1 | 7/2018 | Narang et al. |
| 2019/0087075 A1 | 3/2019 | Dhayanithi et al. |
| 2020/0125483 A1 | 4/2020 | Lipke |

OTHER PUBLICATIONS

"Theme Node, Dynamically theme the ForgeRock out-of-the-box US on the fly", Apr. 2020, ForgeRock, Inc.,, 8 pgs (downloaded from https://github.com/vscheuber/ThemeNode).
McKendrick, What is low-code and No. code? A guide to development platforms, ZDNet, Mar. 3, 2021,9 pgs (downloaded from https://www.zdnet.com/article/special-report-what-is-low-code-no-code-a-guide-to-development- platforms/).
Authentication and Single Sign-On Guide, ForgeRock Access Management 6.5, ForgeRock, Inc., Jul. 4, 2019, 482 pages.
Release Notes, AM 5.0.0, ForgeRock, Inc., Jun. 2, 2020.

\* cited by examiner

REJECTING, DURING VALIDATION, SEQUENCES OF COMPONENTS WITH INVALID INPUT DEPENDENCIES

CROSS-REFERENCE

This application is a continuation of U.S. patent application Ser. No. 16/790,724 titled "Methods and Systems for Correctly Assembling Component Sequences," filed 13 Feb. 2020, now U.S. Pat. No. 11,586,530, issued 21 Feb. 2023.

FIELD OF THE TECHNOLOGY DISCLOSED

The technology disclosed relates generally to providing services to administrators who develop sequences of components for interacting with a user, for software as a service (SaaS) applications for cloud-based computing services and wider area network services. The disclosed technology is also usable for developing component sequences for on-premise computer systems that utilize local area network services.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Businesses depend on computing systems to survive, and enterprise companies often utilize software as a service (SaaS) solutions in the cloud instead of installing servers within the corporate network to deliver services. According to International Data Corporation, almost half of all information technology (IT) spending will be cloud-based in 2018, "reaching 60% of all IT infrastructures and 60-70% of all software, services and technology spending by 2020."

Administrators who set up instances of applications served as SaaS need to be able to customize the experience for each client, such as a regional library system, considering privacy, consent, user role and whether the user is an adult or minor, in addition to security considerations. Customization of modules can be complex, due to the size and complexity of the application modules, which can result in sequences that are difficult to write. Also, the specific rules of a client for authenticating, registering and validating their users can be complicated, and in some cases may need to be altered over time, as client policies change.

An opportunity arises to enable administrators at organizations to assemble trusted sequences of components for interacting with users of services delivered via SaaS applications that run under sovereign control of the organization.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
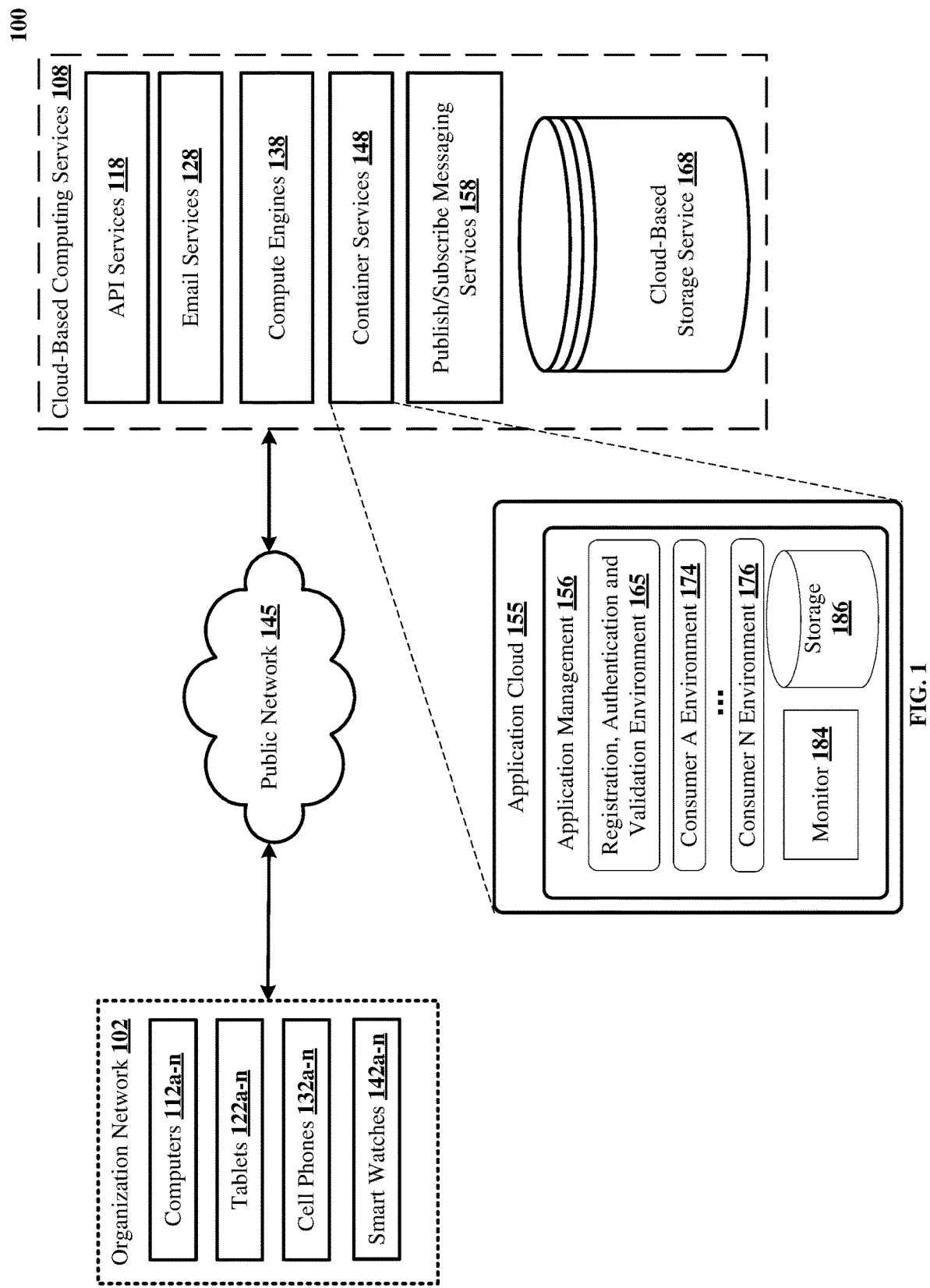
FIG. 1 shows an architectural level schematic of a system for correctly assembling a sequence of components for interacting with a user, for cloud-based computing services, using a SaaS model for a project implemented on a cloud-based computing cluster, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

As more and more essential services move to the cloud, more attention must be paid to accurate registration of users of a client's applications. SaaS solutions offer many business applications, including office software for documents, presentations, worksheets, databases, charts, graphs, digital paintings, electronic music and digital video. Additional SaaS services include library registrations and inventory management, messaging software, DBMS software, management software, CAD software, development software, gamification, virtualization, accounting, customer relationship management (CRM), Management Information Systems (MIS), enterprise resource planning (ERP), human resource management (HRM), talent acquisition, learning management, content management (CM), Geographic Information Systems (GIS) and service desk management. In one example, customers regularly create, edit and save files via Microsoft Office 365 and Google Apps, among others, in a cloud environment.

When enterprise companies utilize SaaS solutions to deliver services, they need to be able to customize registration sequences for their customers in the cloud environment, to align with their policy requirements. For the disclosed technology described, when a new customer registers for SaaS, the cloud service creates a new customer environment. Before the new tenant can begin to use the new customer environment, an administrator needs to define the registration sequence to be used by end users in the environment.

Existing registration modules are complex and challenging to write and customize—to cover policies that include required, optional and sufficient registration criteria. In contrast, the disclosed technology for correctly assembling a registration sequence enables the construction of an executable registration sequence, representable as a directed graph. The constructed executable registration sequences can be modified and updated as requirements change. In one use case, the executable registration sequence is utilized for an application implemented as a SaaS model in the cloud. In that service, every customer's instance has the registration sequence it needs at hand. In one example use of the disclosed technology, a library may utilize a customized registration sequence while shielding the private data of minors, for whom specific policies are required, in addition to offering a distinct registration sequence for adult customers who register for library services. The disclosed technology enables ease of assembly of even complicated registration sequences which also results in flexibility as policies change, and in lower costs to implement specific registration sequences. The disclosed technology for generating and validating sequences applies to authentication sequences, and to self-serve actions such as forgotten password and password reset sequences, as well as to registration sequences.

The next section describes an architecture for correctly assembling a sequence of components, including automatically determining for each component of the sequence, whether the input accepted at the component is used in a subsequent registration component of the sequence, and establishing storage for the inputs that are used in subsequent components. The disclosed technology can also be implemented in an on-premises computer system.

Architecture

FIG. 1 shows an architectural level schematic of a system 100 for correctly assembling a sequence of components for interacting with a user, for cloud-based computing services, using a SaaS model for a project implemented on a cloud-based computing cluster. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes organization network 102, application cloud 155, cloud-based computing services 108 and public network 145. System 100 can include multiple organization networks 104 for multiple organizations. Application cloud 155 includes customer environments hosted on behalf of specific customers of a SaaS application. Each customer's environment interacts with an organization network 102. Organization network 102 includes computers 112a-n, tablets 122a-n, cell phones 132a-n and smart watches 142a-n. In another organization network, organization users may utilize additional devices. Cloud-based computing services 108 includes API services 118, web email services 128, compute engines 138, container services 148 and publish/subscribe messaging services 158 which support event-driven, asynchronous communication among decoupled applications, such as microservices and serverless architectures. Also included is cloud-based storage service 168. Cloud-based computing services 108 can include additional apps and services as well. Application cloud 155 connects to organization network 102 and cloud-based computing services 108 via public network 145.

Application cloud 155 is a service that hosts an application for use by multiple customers, which is implemented using container services 148 as indicated via the dotted lines. Application cloud 155 includes pre-configuration for building rich applications with integrated and secure registration, account recovery, and multifactor authentication. Application cloud 155 with application management 156 includes registration, authentication and validation environment 165 for correctly assembling a registration sequence for cloud-based computing services, and also includes consumer A environment 174 through consumer N environment 176. Multiple different consumers can have environments within a single application cloud 155. In another implementation, the setup can be different. Consumer data is stored within the customer environment. It is not co-mingled with other customers' data and can be accessed only by the customer.

An assembled registration sequence usable on application cloud 155 can implement policy decisions motivated, in some use cases, by compliance requirements of the health insurance portability and accountability act (HIPAA) which asserts data privacy and security provisions for safeguarding medical information. In one example customer environment for cloud-based records management for doctors, the SaaS patient records portal instance for a first doctor is isolated from a distinct SaaS application instance utilized by a different doctor, so the records of patients stored for the first doctor are isolated from the patient records of other doctors. Even if another doctor's data gets breached, the data of the first doctor is not threatened by the breach due to isolation of the secure application instance.

Continuing further with the description of FIG. 1, system 100 can be used in the delivery of many kinds of services as cloud-based computing services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™ Box™, Dropbox™, Google Apps™, Amazon AWS™, Microsoft Office 365™, Workday™ Oracle on Demand™, Taleo™, Yammer™ Jive™ and Concur™.

In the interconnection of the elements of system 100, public network 145 couples computers 112a-n, tablets 122a-n, cell phones 132a-n, smart watches 142a-n, API services 118, email services 128, compute engines 138, container services 148 with identity cloud 155, publish/subscribe messaging services 158 and cloud-based storage service 168 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecurID, digital certificates, and more, can be used to secure the communications.

Further continuing with the description of the system architecture in FIG. 1, application cloud 155 includes monitor 184 and storage 186 which can include one or more computers and computer systems coupled in communication with one another. Customer environments can display registration directed graphs to monitor 184 and can store registration component inputs that are to be used in subsequent registration components in storage 186 or in one or more virtual computing and/or storage resources. Monitor 184 is used to display the disclosed registration sequence setup graphical user interface (GUI) with registration components that accept inputs, have input chain dependencies, and have outputs. The GUI supports construction of an executable registration sequence by connecting at least five of the registration components in a directed graph, as described in detail later. Monitor 184 can also be used to display availability of customer environments and can include infrastructure level monitoring and basic application level metrics, as well as configuration controls for organization administrators of customers. For example, monitor 184 can utilize one or more Google Compute engines or Amazon EC2 instances and storage 186 can be Google Cloud Platform datastore or Amazon S3™ storage. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection. For example, organization network 102 can be coupled via network(s) 145 (e.g., the Internet), identity cloud 155 can be coupled via a direct network link and cloud-based computing services 108 can be coupled by yet a different network connection.

Storage 186 can store inputs for registration components which made be used in subsequent registration components of a registration sequence. Information from one or more tenants, including registration sequences for multiple clients and for users of the clients' applications, can be stored into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based computing services 108. Non-structured data, such as free text, can also be provided by, and targeted back to cloud-based computing services 108. Both structured and non-structured data are capable of being aggregated by identity cloud 155. For instance, assembled metadata can be stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects can be stored in a schema-less or NoSQL key-value metadata store like Apache Cassandra™, Google's BigTable™, HBase™ Voldemort™, CouchDB™, MongoDB™, Redis™, Riak™, Neo4j™, etc.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Figure 2:
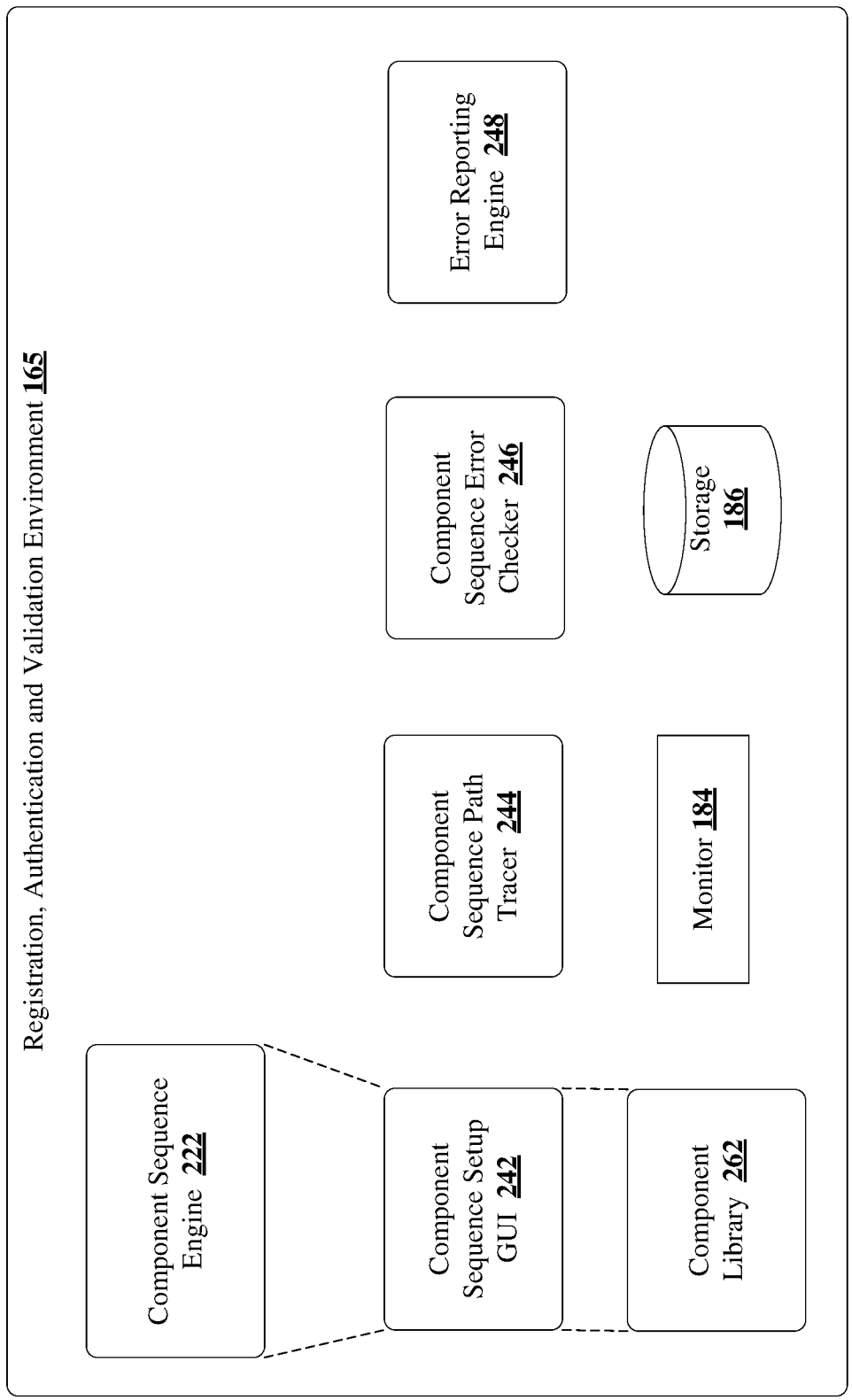
FIG. 2 shows a simplified block diagram of a registration, authentication and validation environment which provides a component sequence setup GUI that has access to components in a component library.

FIG. 2 shows a simplified block diagram 200 of registration, authentication and validation environment 165 which provides a component sequence setup GUI 242 that has access to components in component library 262. Components accept inputs, have input chain dependencies, and have outputs. GUI 242 supports construction of an executable component sequence by connecting components in a directed graph. Example sequences represented in directed graphs are described later. Registration, authentication and validation environment 165 also includes component sequence path tracer 244 that traces the multiple paths through the components in the directed graph, resulting from at least one conditional branch at a first component, as the components are connected in the directed graph. Component sequence error checker 246 locates errors in use of components, which follow previous components, that result from failure to satisfy the input chain dependencies of the component. Error reporting engine 248 reports the errors to a user of GUI 242, before executing the registration sequence and causing the error. In one implementation the errors are displayed on monitor 184 via component sequence setup GUI 242.

Continuing the description of registration, authentication and validation environment 165, component sequence path tracer 244 analyzes the directed graph of registration components and automatically determines for a component, whether the input accepted at the component is used in a subsequent component of the sequence. If the input is used in the subsequent component, the input is stored in storage 186 and made available to the subsequent component or components that use the input.

Figure 3:
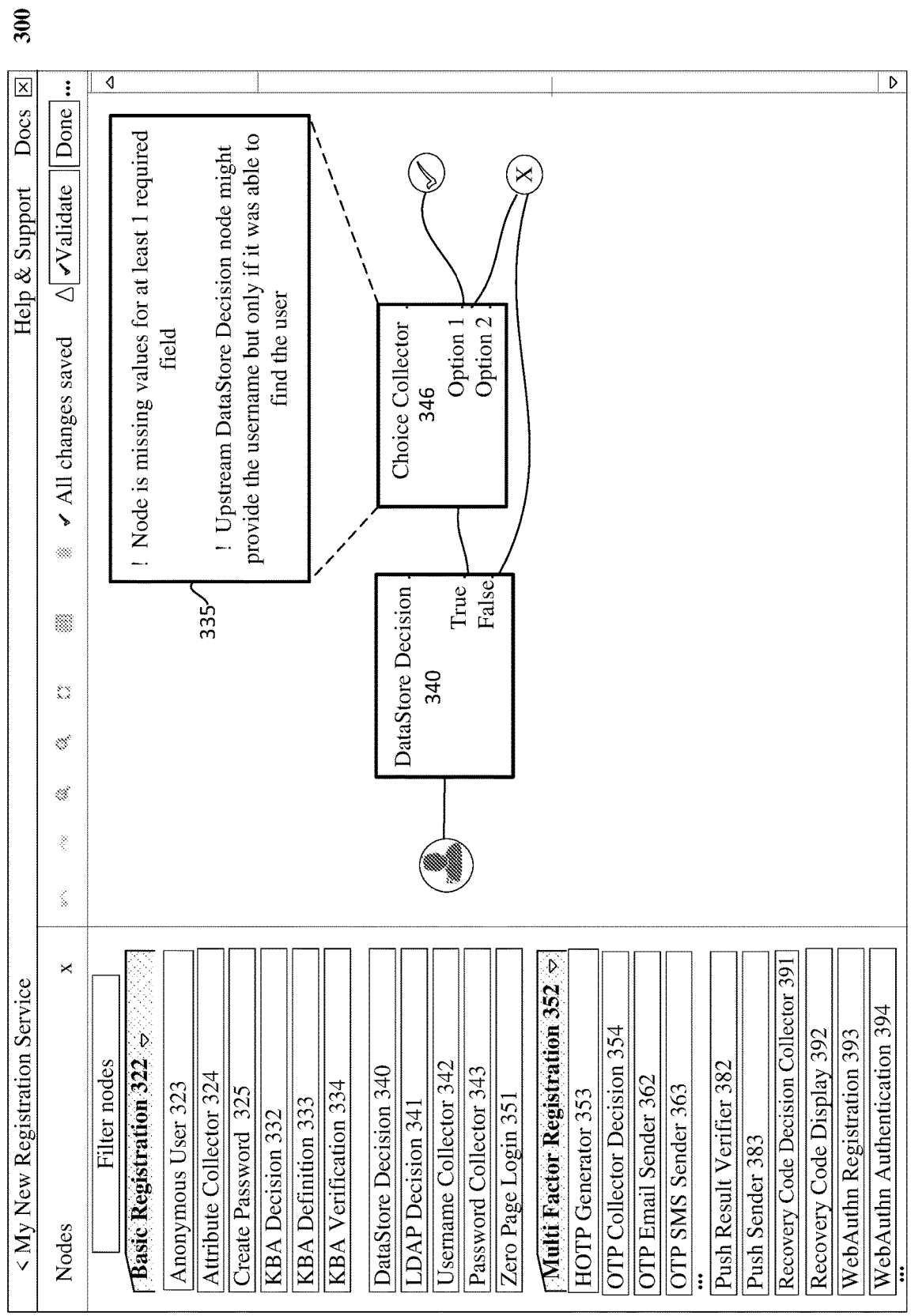
FIG. 3 shows an example registration sequence setup graphical user interface that is usable for correctly assembling a registration sequence and shows a very simple example directed graph with two registration components.

FIG. 3 shows an example registration sequence setup graphical user interface (GUI) 300 that is usable for correctly assembling a registration sequence and a very simple example directed graph with two registration components. GUI 300 lists registration components that accept inputs, have input chain dependencies, and have outputs. Node elements, also known as registration components, are listed on the left side of GUI 300, with dropdown categories of basic registration 322 and multi-factor registration 352. Registration component can be added to a registration sequence being assembled by dragging and dropping the node from the menu list on the left side of GUI 300. Each component has a single function. For example, some nodes determine a value which is derived or calculated from the node's input. Other nodes change format, convert character sets, perform hashing, calculating, and otherwise manipulate data. Example basic registration components include anonymous user 323, attribute collector 324 and create password 325. For attribute collector 324, as well as other data collector and data generating components such as create password 325, the disclosed system automatically determines for the components, whether the input accepted at the component is used in a subsequent registration component of the directed graph, establishes storage for inputs that are to be used in a subsequent component and makes the input available to the subsequent component.

Additional basic components usable to assemble a sequence that satisfies a specific set of policies include KBA decision 332, KBA definition 333 and KBA verification 334 nodes. Knowledge-based authentication (KBA) seeks to prove the identity of someone accessing a service, such as a library lending service, financial institution or website; and as such, KBA requires the knowledge of private information of the individual to prove that the person providing the identity information is the owner of the identity. Static KBA is based on a pre-agreed set of shared secrets, and dynamic KBA is based on questions generated from a wider base of personal information. Practically, KBA makes use of questions and answers provided by users during authentication, registration or validation, such as the color of the user's first car.

Continuing with the description of the registration sequence GUI 300, other nodes may also be used in a registration sequence in many cases, include data store decision 340 and Lightweight Directory Access Protocol (LDAP) decision 341. LDAP application protocol accesses and maintains distributed directory information services over an Internet Protocol (IP) network. Other components used in registration sequences include username collector 342, password collector 343 and zero page login 351 which checks for selected headers. An additional dropdown category of multi-factor registration 352 components includes HMAC-based one-time password registration component (HOTP) generator 353 which uses a one-time password (OTP) algorithm based on hash-based message authentication codes (HMAC), a cornerstone of the Initiative for Open Authentication (OATH). Additional nodes include OTP collector decision 354, OTP email sender 362 and OTP SMS sender 363. More available registration components, listed as nodes in GUI 300 include push result verifier 382, push sender 383, recovery code decision collector 384, recover code display 392, WebAuthn registration 393 and WebAuthn authentication 394. Still other registration components (not shown) can be utilized for the assembling a registration sequence: account lockout, auth level decision, modify auth level, reCaptcha, cookie presence decision, persistent cookie decision and set persistent cookie. Additional node options (not shown) for building the directed graph that represents the registration sequence include OAuth 2.0, OpenID connect, provision dynamic account, social Facebook, social google, social ignore profile, agent data store decision, choice collector, failure URL, get session data and inner tree evaluator. Also, message node, meter node, page node, polling wait node, register logout node, remove session properties node, retry limit node, scripted decision node, set session properties node, success URL node, timer start node and timer stop node can be used as registration component in an executable registration sequence. The list is not intended to be exhaustive. One skilled in the art may identify additional useful registration components for satisfying a policy set for an enterprise.

FIG. 3 shows a very simple example directed graph with two registration components. Every registration component declares its inputs and outputs. Inputs can be either required or optional, the latter consumed if present but not required in order to function. Outputs can be declared as "for every outcome" or "for individual outcomes". For each path found, the terminus node's requirements are evaluated to determine whether they are all or partially satisfied or wholly unsatisfied. A distinction is made between required inputs and optional inputs, flagged as errors and informational respectively. In the FIG. 3 example, the elements of the directed graph are datastore decision 340, with a true option and a false option, and choice collector 346, with option 1 and option 2. A datastore registration component queries a database by a key to look up information. The result of choice collector 346 leads to success, shown by a check, or failure, shown by the 'X'. Construction of the executable registration sequence can include the use of many of the different registration components listed earlier. GUI 300 also includes registration-tree-specific popup with validation-related information 335 which is accessed by hovering over a registration component.

Figure 4A:
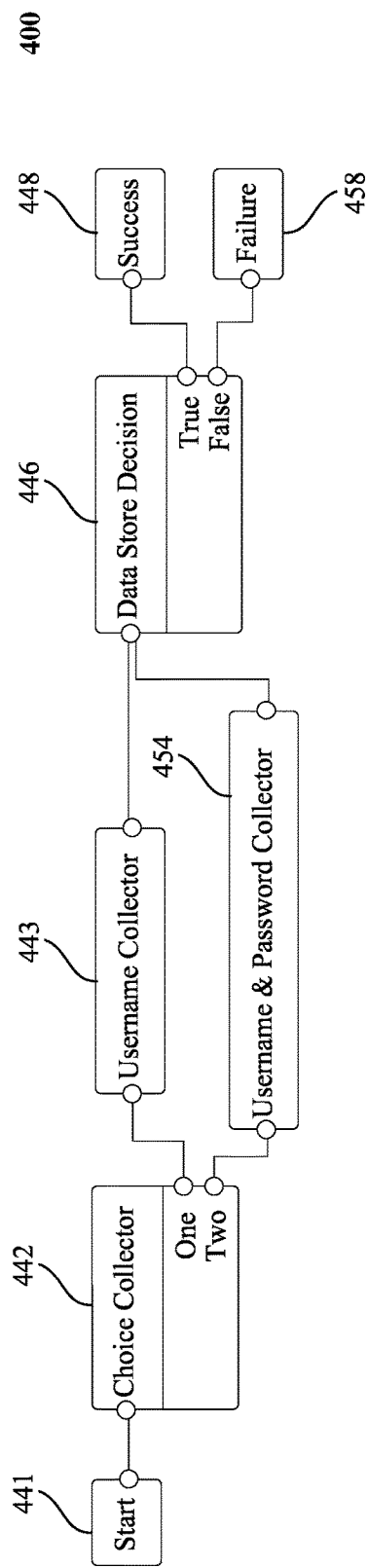
FIG. 4A shows an example constructed directed graph of an executable registration sequence connecting registration components.

FIG. 4A shows an example constructed directed graph 400 of an executable registration sequence connecting registration components. In graph 400, username collector 443 collects only the username, and username and password collector 454 collects both the username and the password. Data Store Decision 446 registration component requires both attributes to succeed and both are required. The directed graph shown in FIG. 4A generates an error if the "One" path is chosen from Choice Collector 442 validation component.

The disclosed method of correctly assembling a registration sequence traverses the tree to identify all possible paths from start 441 to each registration component in the directed graph, traversing conditional branches to the terminus components: success 448 and failure 458. In one implementation, the logic traverses the directed graph from right to left to identify all possible paths from start to each component in the graph, taking the end components and working back to the start. After the registration sequence is generated, the registration process runs from start to success or failure. The disclosed validation technology applies to authentication, and to self-serve action such as forgotten password and password reset sequences, as well as to registration sequences. The identified possible paths for graph 400 are listed next: start 441 to choice collector 442 to username collector 443 to data store collector 446 to success 448; start 441 to choice collector 442 to username collector 443 to data store collector 446 to failure 458; start 441 to choice collector 442 to username and password collector 454 to data store collector 446 to success 448; and start 441 to choice collector 442 to username and password collector 454 to data store collector 446 to failure 458.

Continuing the description of FIG. 4A, validation checks each registration component's requirements to ensure that the nodes which came before provided the required data. To do this on a node-by-node basis, the paths listed earlier are further divided such that each node in directed graph 400, except success 448 and failure 458 which have no requirements, is a terminus for the path. Resulting possible paths are listed next:

start 441 to choice collector 442;
start 441 to choice collector 442 to username collector 443;
start 441 to choice collector 442 to username and password collector 454
start 441 to choice collector 442 to username collector 443 to data store collector 446 to success 448
start 441 to choice collector 442 to username and password collector 454 to data store collector 446 to success 448

For the resulting possible paths of the directed graph, a list of unsatisfied requirements is generated. The full set of possible paths and sub-paths is reported, complete with the list of unsatisfied requirements for each path. The disclosed technology for correctly assembling a registration sequence identifies at least one error in use of a second registration component that results from failure to satisfy the input chain dependencies of the second registration component and reports the error to a user of the GUI, before executing the registration sequence and causing the error. Resulting unsatisfied requirements for the example directed graph 400 are listed next.

no unsatisfied requirements for start 441 to choice collector 442
no unsatisfied requirements for start 441 to choice collector 442 to username collector 443
no unsatisfied requirements for start 441 to choice collector 442 to username and password collector 454
password is unsatisfied for start 441 to choice collector 442 to username collector 443 to data store collector 446 to success 448
no unsatisfied requirements for start 441 to choice collector 442 to username and password collector 454 to data store collector 446 to success 448

Beyond hard requirements each registration component, aka node, may declare inputs that will be consumed if present, but which will not prevent proper operation of the component if they are absent. Likewise, each component may declare outputs that are made available only for certain outcomes, for example, one and two of choice collector 442 in direct graph 400. The path and requirement analysis takes these optional and outcome-dependent values into account when calculating requirements. Unsatisfied optional requirements result in an informational notice in the results rather than an error notice.

Realms logically group together configuration, policies and users. In one example, usage can include a realm for employees and a realm for customers; in another example, one realm for the parent company customers, and another realm for subsidiary customers. Registration can vary according to realm, and it is the customer that determines which realm is applicable at the point of registration or authentication.

Figure 4B:
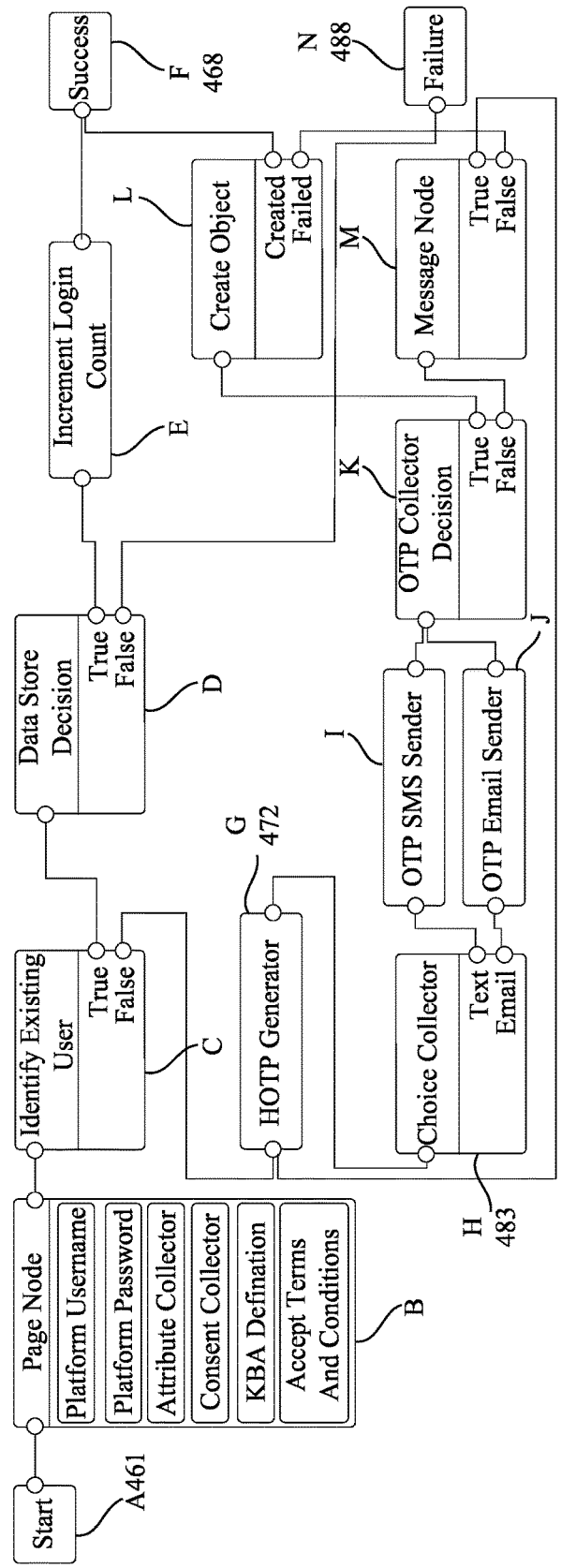
FIG. 4B shows an example constructed directed graph of an executable registration sequence connecting more registration components to add functionality, with several branches and a potential loop.

FIG. 4B shows an example constructed directed graph of an executable registration sequence connecting more registration components to add functionality, with several branches and a potential loop. First, the necessary information to create a new profile is requested from the user. If the information provided identifies an existing user profile, then the user is logged in using the information provided. Otherwise a process to validate either the user's cell phone number or their email address is activated. If the user fails to provide the correct one-time-password sent via text or email, then they are asked to try again or to quit. Each cycle through this verification uses a uniquely generated code. The validation process identifies all possible paths from Start to each component in the directed graph. The registration example includes alphabetic identifiers for clarity. A list of possible paths, each of which is validated to determine whether the expected input and outputs are present, is next.

1. A B
2. A B C
3. A B C D
4. A B C D E
5. A B C D E F
6. A B C D N
7. A B C G
8. A B C G H
9. A B C G H I
10. A B C G H I K
11. A B C G H I K L
12. A B C G H I K L F
13. A B C G H I K L N
14. A B C G H I K M
15. A B C G H I K M (G)
16. A B C G H I K M N
17. A B C G H J
18. A B C G H J K
19. A B C G H J K L
20. A B C G H J K L F
21. A B C G H J K M N
22. A B C G H J K M
23. A B C G H J K M (G)
24. A B C G H J K M N

Paths 15 and 23 loop back to component G 472, which will consider these full paths but no further. That is, the validation will not consider H 483 twice for component G 472.

Paths are analyzed starting with the final component in each path. Note that Success 468, Failure 488 and Start 461 are not analyzed, as those components are special-purpose and do not specify inputs or outputs. For each path listed above and for any requirement of the final component in the path not satisfied by any of the proceeding components, an error is accumulated for that specific path. Some requirements are optional, meaning that the component will consume the data if present but will not fail if it is absent. For this optional data that is absent an informational component is accumulated for that specific path. This information is returned from validation in full detail. An example snippet of code with error messages is listed next for GUID with the id and path with the id shown, in JSON syntax format.

```
{
    "id": "ca3846c5-7c66-49c0-b545-d807cb2b36a1",
    "errors": [
    {
    "path": [
    "54cfb57e-8f6a-49f0-a526-83b9850183aa",
    "6b7e9e24-32a8-4d1c-b4bf-2ad58a10a5cd"
    ],
    "info": [ ],
    "warning": [ ],
    "error": [
    {
    "message": "Input is not provided by an upstream node"
    "level": "error",
    "type": "unsatisfiedInput",
    "detail": "password"
    }
    ]
    },
```

Figure 5A:
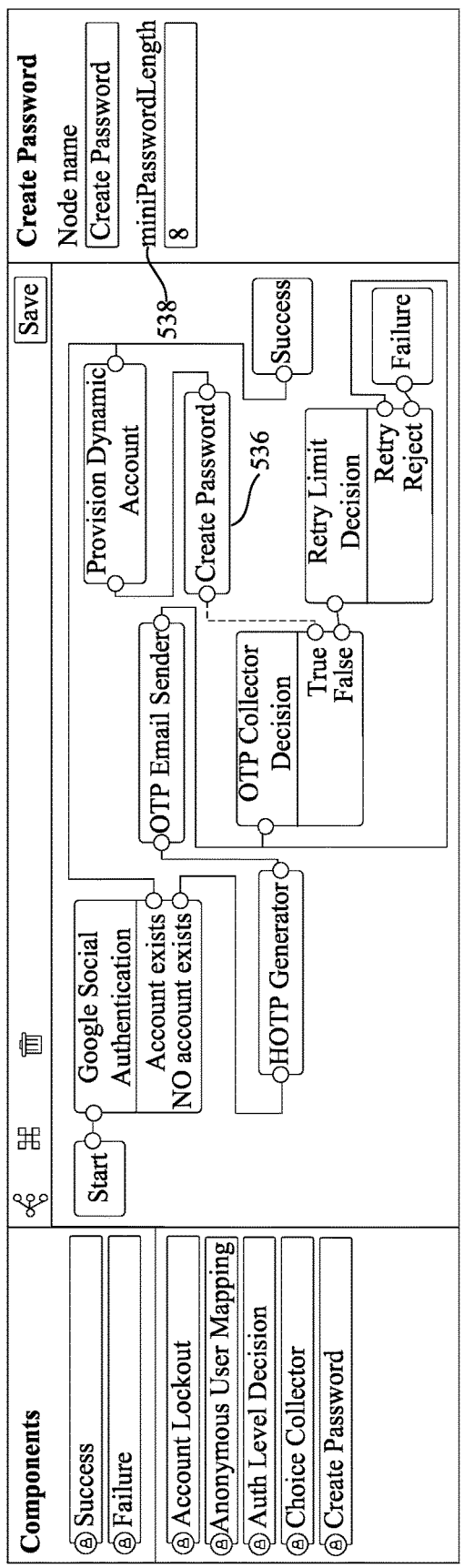
FIG. 5A shows construction of an executable registration sequence connecting more than five of the registration components in a directed graph.

FIG. 5A shows construction of an executable registration sequence connecting more than five of the registration components in a directed graph. In this example GUI, information about a selected component is listed in the right column of the GUI and can be configured by selecting the component. In this case, the create password component 536 includes a configurable field for setting a minimum password length 538, which has been set to eight characters. This example sequence includes a Google Social Authentication node, with options of "account exists" and "no account exists." This federated registration component relies on Google to process trust sharing. In another example, a Facebook social authentication registration component could be included in the registration sequence being designed. The session data components utilize contextual information about the session at hand, including browser client, language, IP, MAC, and message header info.

Figure 5B:
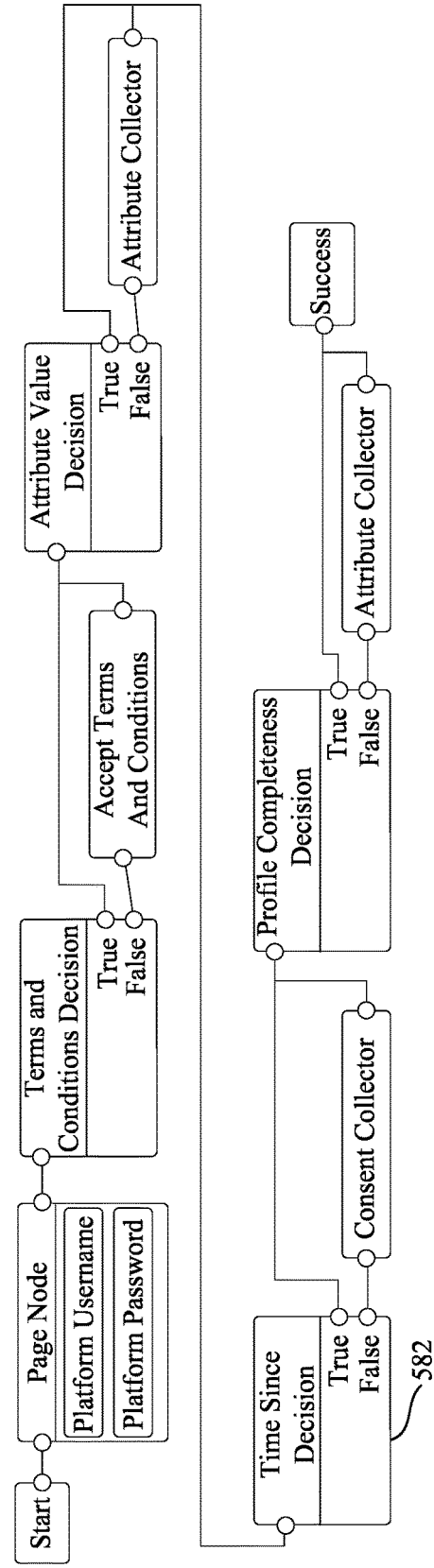
FIG. 5B shows an executable authentication sequence connecting components in a directed graph.

FIG. 5B shows an executable authentication sequence connecting more than five components in a directed graph. In this example, the username and password from the user are collected as usual and then several factors of their profile or behavior are checked to decide whether to collect additional information. The Time Since Decision component 582 will branch to ask the user to consent to certain data sharing after some period since initial registration has passed. Additional conditions, not included here, can be added by adding more components to the directed graph.

Another example use case for the disclosed technology is public library registration for checking out books. When a user arrives at the web site and clicks registration, a web page needs to request specific attributes of personal information, such as name, email, phone, address, date of birth and password creation. For correctly assembling a registration sequence, the registration components of the constructed registration sequence will need to include collectors as well as validators of the information entered. The disclosed technology enable tailoring of a user's registration experience based on the user's device being a mobile device or desktop, and also registering minors who have account limitations and may need parental approval for registering.

Workflow

Figure 6:
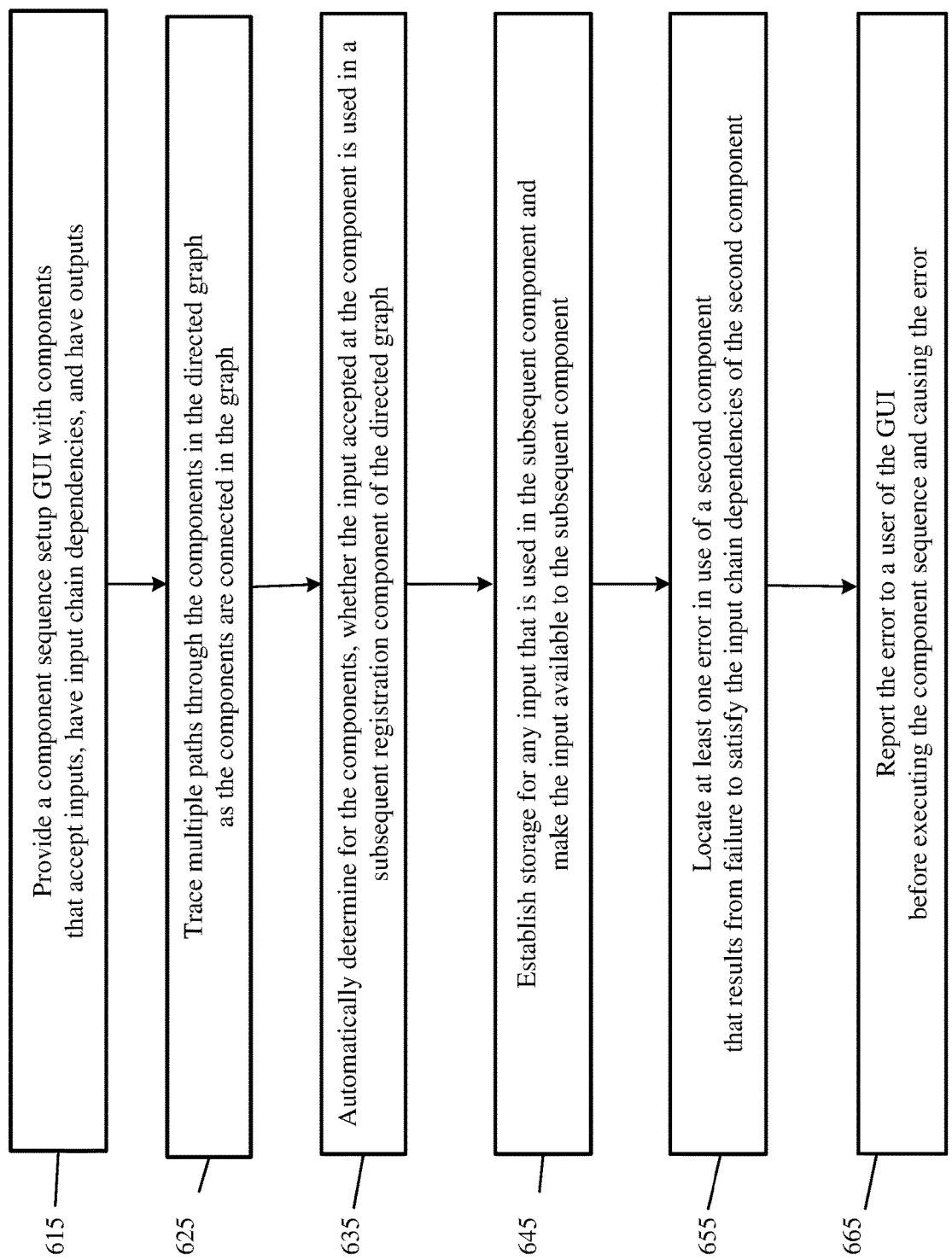
FIG. 6 shows a flowchart of steps for correctly assembling a component sequence for a project implemented on cloud-based computing services.

FIG. 6 shows a flowchart 600 of steps for correctly assembling a component sequence for a project implemented on cloud-based computing services. Flowchart 600 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to a system which includes registration, authentication and validation environment 165.

Step 615 includes providing a component sequence setup graphical user interface (GUI) with components that accept inputs, have input chain dependencies, and have outputs. The GUI supports construction of an executable sequence by connecting at least five of the registration components in a directed graph.

Step 625 includes tracing multiple paths through the components in the directed graph, resulting from at least one conditional branch at a first component, as the registration components are connected in the directed graph.

Step 635 includes automatically determining for at least one of the components, whether the input accepted at the component is used in a subsequent component of the directed graph.

Step 645 includes establishing storage for at least one input that is used in the subsequent component and making the input available to at least the subsequent component.

Step 655 includes sending an environment ready email with a one-time link to the customer's user locating at least one error in use of a second component that results from failure to satisfy the input chain dependencies of the second component.

Step 665 includes reporting the error to a user of the GUI, before executing the component sequence and causing the error. Other implementations may perform the actions in different orders and/or with different, fewer or additional actions than those illustrated in FIG. 6. Multiple actions can be combined in some implementations.

Computer System

Figure 7:
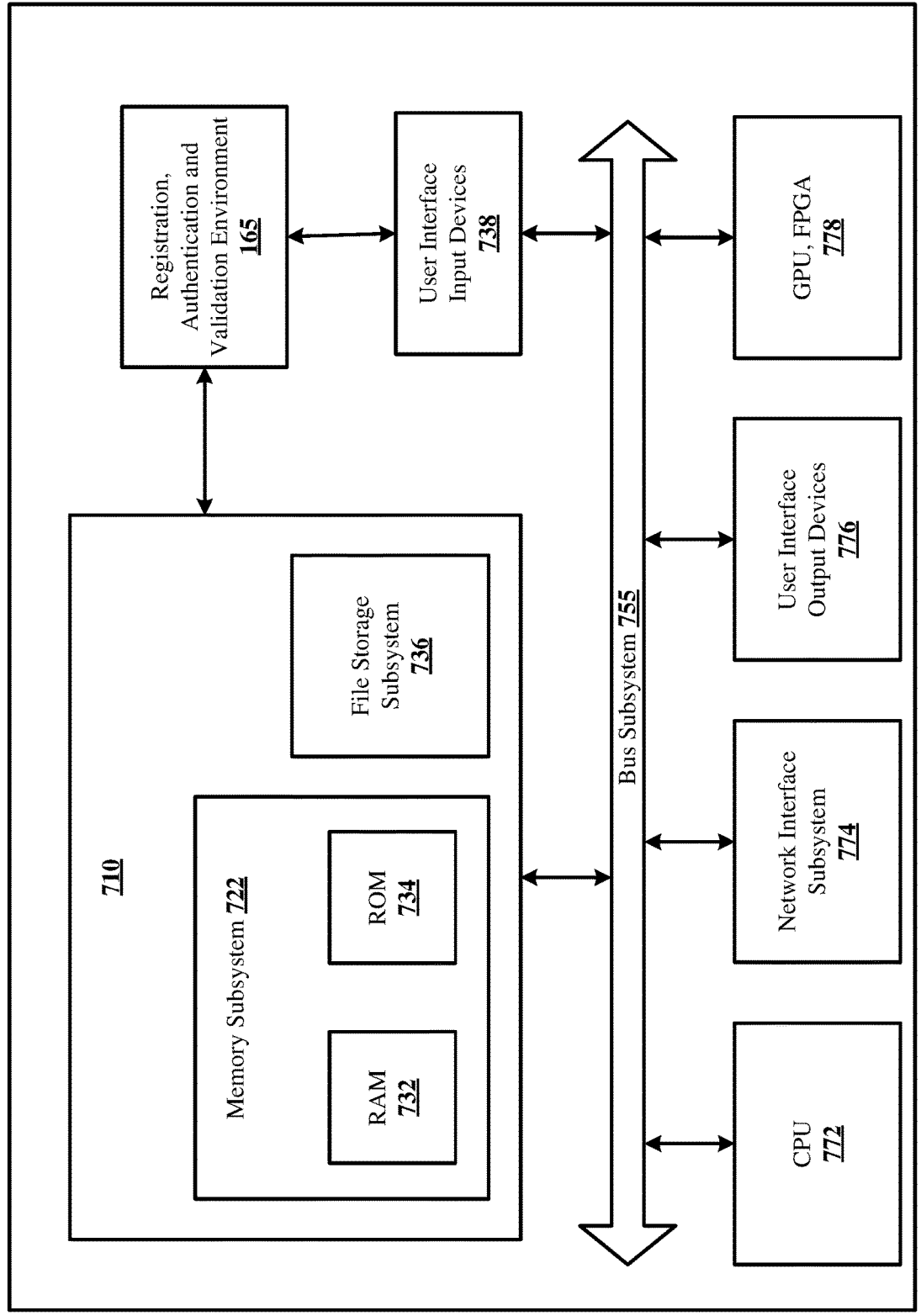
FIG. 7 is a simplified block diagram of a computer system that can be used to implement a method of correctly assembling a sequence of components for interacting with a user, according to one embodiment of the disclosed technology.

FIG. 7 is a simplified block diagram of a computer system 700 that can be used to implement a method of correctly assembling a sequence of components for interacting with a user in cloud-based environment. In another case for correctly assembling a component sequence, the method can be implemented using an on-premises computer system. Computer system 700 includes at least one central processing unit (CPU) 772 that communicates with a number of peripheral devices via bus subsystem 755, and Registration, Authentication and Validation Environment 165 for successfully assembling a component sequence. These peripheral devices can include a storage subsystem 710 including, for example, memory devices and a file storage subsystem 736, user interface input devices 738, user interface output devices 776, and a network interface subsystem 774. The input and output devices allow user interaction with computer system 700. Network interface subsystem 774 provides an interface to outside networks, including an interface to corresponding interface devices in other computer systems. In one implementation, identity cloud 155 of FIG. 1 is communicably linked to the storage subsystem 710 and the user interface input devices 738. User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 776 can include a display subsystem, a printer, a fax machine, or non-visual displays such as audio output devices. The display subsystem can include an LED display, a flat-panel device such as a liquid crystal display (LCD), a projection device, a cathode ray tube (CRT), or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. Subsystem 778 can be graphics processing units (GPUs) or field-programmable gate arrays (FPGAs).

Memory subsystem 722 used in the storage subsystem 710 can include a number of memories including a main random-access memory (RAM) 732 for storage of instructions and data during program execution and a read only memory (ROM) 734 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 710, or in other machines accessible by the processor.

Bus subsystem 755 provides a mechanism for letting the various components and subsystems of computer system 700 communicate with each other as intended. Although bus subsystem 755 is shown schematically as a single bus, alternative implementations of the bus subsystem can use multiple busses.

Computer system 700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 700 depicted in FIG. 7 is intended only as a specific example for purposes of illustrating the preferred embodiments of the present invention. Many other configurations of computer system 700 are possible having more or fewer components than the computer system depicted in FIG. 7.

Particular Implementations

Some implementations and features for correctly assembling a registration sequence for cloud-based computing services are described in the following discussion.

One implementation discloses a computer-implemented method of correctly assembling a sequence of components for interacting with a user, including providing a sequence setup graphical user interface (GUI) with registration components that accept inputs, have input chain dependencies, and have outputs. The GUI supports construction of an executable sequence by connecting at least five of the components in a directed graph. The disclosed method also includes tracing multiple paths through the components in the directed graph, resulting from at least one conditional branch at a first component, as the components are connected in the directed graph. The method further includes testing whether the input chain dependencies of components under evaluation, including a second component, are satisfied when the components are invoked following any of the multiple paths, locating at least one error in use of the second component that results from failure to satisfy the input chain dependencies of the second component and reporting the error to a user of the GUI, before executing the sequence and causing the error. In some implementations, a user can be a device.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the disclosed method further includes assembling a registration sequence. In another implementation, the assembled sequence is an authentication sequence. In many implementations of the disclosed technology, the assembled sequence is validated.

One implementation of the disclosed method includes automatically determining for at least one of the components, whether the input accepted at the component is used in a subsequent component of the directed graph. The method also includes establishing storage for at least one input that is used in the subsequent component and making the input available to at least the subsequent component. The components can be one of anonymous user node, attribute collector node, create-password node; knowledge-based definition node, knowledge-based decision node, and knowledge-based verification node. Additional example components include attribute collector, username collector, password collector, recovery code decision collector and choice collector. Further examples include knowledge-based decision components and data store decision, lightweight directory access protocol (abbreviated LDAP) decision, one time password (abbreviated OTP) collector decision, authentication level decision, cookie presence decision, persistent cookie decision, agent data store decision and scripted decision.

In some implementations of the disclosed method, the sequence of components is assembled for use with a cloud-based computing service. For those disclosed implementations, the cloud-based computing service is one of Google Cloud Platform (GCP), Amazon Web Services (AWS) or Microsoft Azure Virtual Platform. Another service provider could be utilized as well. In other cases of the disclosed the sequence of components is assembled for use with at least one of a local area network (LAN) and a wide area network (WAN).

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of rejecting, during validation, a sequence of components intended for interacting with a user, including:
   providing a sequence setup graphical user interface (abbreviated GUI) supporting construction of an executable sequence by connecting at least five components in a directed graph;
   tracing multiple paths through the directed graph, including from at least one conditional branch at a first up-chain component, wherein down-chain components accept as input and depend on output stored by at least one up-chain component, referred to as input chain dependencies;
   locating at least one error in use of a particular down-chain component when invoked following one of the multiple paths, wherein the error results from failure to satisfy any of the input chain dependencies of the particular down-chain component; and
   reporting the error during validation to a user of the GUI.

2. The computer-implemented method of claim 1, wherein the executable sequence is assembled for use with a cloud-based computing service.

3. The computer-implemented method of claim 2, wherein the cloud-based computing service is one of Google Cloud Platform (abbreviated GCP), Amazon Web Services (abbreviated AWS) or Microsoft Azure Virtual Platform.

4. The computer-implemented method of claim 1, wherein the executable sequence is assembled for use with at least one of a local area network (abbreviated LAN) and a wide area network (abbreviated WAN).

5. The computer-implemented method of claim 1, wherein the executable sequence includes a registration sequence.

6. The computer-implemented method of claim 1, wherein the executable sequence includes an authentication sequence.

7. A non-transitory computer readable medium including program instructions that, when executed on hardware, implement actions of rejecting, during validation, a sequence of components intended for interacting with a user, including:
   providing a sequence setup graphical user interface (abbreviated GUI) supporting construction of an executable sequence by connecting at least five components in a directed graph;
   tracing multiple paths through the directed graph, including from at least one conditional branch at a first up-chain component, wherein down-chain components accept as input and depend on output stored by at least one up-chain component, referred to as input chain dependencies;
   locating at least one error in use of a particular down-chain component when invoked following one of the multiple paths, wherein the error results from failure to satisfy any of the input chain dependencies of the particular down-chain component; and
   reporting the error during validation to a user of the GUI.

8. The non-transitory computer readable medium of claim 7, wherein the executable sequence is assembled for use with a cloud-based computing service.

9. The non-transitory computer readable medium of claim 8, wherein the cloud-based computing service is one of Google Cloud Platform (abbreviated GCP), Amazon Web Services (abbreviated AWS) or Microsoft Azure Virtual Platform.

10. The non-transitory computer readable medium of claim 7, wherein the executable sequence is assembled for use with at least one of a local area network (abbreviated LAN) and a wide area network (abbreviated WAN).

11. The non-transitory computer readable medium of claim 7, wherein the executable sequence includes a registration sequence.

12. The non-transitory computer readable medium of claim 7, wherein the executable sequence includes an authentication sequence.

13. A system including a processor and memory coupled to the processor, the memory including program instructions that, when executed on the processor, implement actions of rejecting, during validation, a sequence of components intended for interacting with a user, including:
   providing a sequence setup graphical user interface (abbreviated GUI) supporting construction of an executable sequence by connecting at least five components in a directed graph;
   tracing multiple paths through the directed graph, including from at least one conditional branch at a first up-chain component, wherein down-chain components accept as input and depend on output stored by at least one up-chain component, referred to as input chain dependencies;
   locating at least one error in use of a particular down-chain component when invoked following one of the multiple paths, wherein the error results from failure to satisfy any of the input chain dependencies of the particular down-chain component; and
   reporting the error during validation to a user of the GUI.

14. The system of claim 13, wherein the executable sequence is assembled for use with a cloud-based computing service.

15. The system of claim 14, wherein the cloud-based computing service is one of Google Cloud Platform (abbreviated GCP), Amazon Web Services (abbreviated AWS) or Microsoft Azure Virtual Platform.

16. The system of claim 13, wherein the executable sequence is assembled for use with at least one of a local area network (abbreviated LAN) and a wide area network (abbreviated WAN).

17. The system of claim 13, wherein the executable sequence includes a registration sequence.

18. The system of claim 13, wherein the executable sequence includes an authentication sequence.

* * * * *